US012769062B2

(12) United States Patent
Kim et al.

(10) Patent No.: US 12,769,062 B2
(45) Date of Patent: Oct. 20, 2026

(54) OPTICAL DEVICE AND OPERATION METHOD THEREOF

(71) Applicant: University-Industry Cooperation Group Of Kyung Hee University, Gyeonggi-do (KR)

(72) Inventors: Youngduck Kim, Seongnam-si (KR); Min Hyun Cho, Seoul (KR)

(73) Assignee: University-Industry Cooperation Group Of Kyung Hee University, Gyeonggi-do (KR)

( * ) Notice: Subject to any disclaimer, the term of this patent is extended or adjusted under 35 U.S.C. 154(b) by 292 days.

(21) Appl. No.: 18/569,866

(22) PCT Filed: Oct. 19, 2021

(86) PCT No.: PCT/KR2021/014587
§ 371 (c)(1),
(2) Date: Dec. 13, 2023

(87) PCT Pub. No.: WO2022/265166
PCT Pub. Date: Dec. 22, 2022

(65) Prior Publication Data

US 2024/0280755 A1 Aug. 22, 2024

(30) Foreign Application Priority Data

Jun. 17, 2021 (KR) ........................ 10-2021-0078971

(51) Int. Cl.
*G02B 6/26* (2006.01)
*G02B 6/12* (2006.01)
(Continued)

(52) U.S. Cl.
CPC ............. *G02B 6/2934* (2013.01); *G02B 6/12* (2013.01); *G02F 1/0316* (2013.01); *G02F 1/035* (2013.01); *G02B 2006/12035* (2013.01)

(58) Field of Classification Search
CPC .................... G02B 6/2934; G02B 6/12; G02B 2006/12035; G02B 2006/12123;
(Continued)

(56) References Cited

U.S. PATENT DOCUMENTS

| | | | |
|---|---|---|---|
| 9,291,836 | B2 | 3/2016 | Kim et al. |
| 9,599,770 | B2 | 3/2017 | Englund et al. |
| 10,574,029 | B2 | 2/2020 | Hwang et al. |

(Continued)

FOREIGN PATENT DOCUMENTS

| | | | |
|---|---|---|---|
| CN | 104297949 | A | 1/2015 |
| CN | 106990563 | A | 7/2017 |

(Continued)

OTHER PUBLICATIONS

Christopher T. Phare et al., Graphene electro-optic modulator with 30 GHz bandwidth, Nature photonics 9, 511-514(2015).

(Continued)

*Primary Examiner* — Jennifer Doan
(74) *Attorney, Agent, or Firm* — Harness, Dickey & Pierce, P.L.C.

(57) ABSTRACT

The present invention provides an optical device and a method for operating the same, the optical device including a substrate, an optical waveguide extending in a first direction on the substrate, and a ring resonator adjacent to the optical waveguide in a second direction intersecting the first direction on the substrate, wherein the ring resonator includes a first graphene layer and a second graphene layer on the substrate, a first insulating layer between the substrate and the first graphene layer, a second insulating layer between the first graphene layer and the second graphene layer, a first electrode and a second electrode connected to the first graphene layer, and a third electrode connected to the second graphene layer, wherein the first graphene layer, the second graphene layer, the first insulating layer, and the (Continued)

second insulating layer have a ring shape or a partially open ring shape.

11 Claims, 17 Drawing Sheets

(51) Int. Cl.

| | |
|---|---|
| ***G02B 6/293*** | (2006.01) |
| ***G02F 1/03*** | (2006.01) |
| ***G02F 1/035*** | (2006.01) |

(58) Field of Classification Search

CPC ...... G02B 2006/12142; G02B 6/29341; G02B 6/12007; G02B 6/26; G02F 1/0316; G02F 1/035

See application file for complete search history.

(56) References Cited

U.S. PATENT DOCUMENTS

| | | | |
|---|---|---|---|
| 2012/0281957 A1 | 11/2012 | Chamanzar et al. | |
| 2013/0259078 A1* | 10/2013 | Ohira | H01S 5/22 372/45.01 |
| 2016/0161675 A1* | 6/2016 | Englund | G02F 1/0118 250/206 |
| 2018/0284561 A1 | 10/2018 | Phare et al. | |
| 2019/0250435 A1* | 8/2019 | Mazed | G02F 1/035 |
| 2019/0385673 A1 | 12/2019 | Bosman et al. | |

FOREIGN PATENT DOCUMENTS

| | | |
|---|---|---|
| KR | 10-2014-0135014 A | 11/2014 |
| KR | 10-2018-0134686 A | 12/2018 |

OTHER PUBLICATIONS

D. Conteduca et al., Resonant Graphene-based Tunable Optical Delay line, IEEE, 2015.

Ren-Jye Shiue et al., Thermal radiation control from hot graphene electrons coupled to a photonic crystal nanocavity, nature communications, 2019.

Jeremy Wright, High quality factor silicon nitride ring resonators for biological sensing, ResearchGate, 2010.

Young Duck Kim et al., Ultrafast graphene light emitter (Nano Lett.), 2018.

Nathan Youngblood et al., Multifunctional Graphene Optical Modulator and Photodetector Integrated on Silicon Waveguides(Nano Lett.), 2014.

Qiong Ma et al., Tuning ultrafast electron thermalization pathways in a van der Waals heterostructure(nature physics..), 2016.

Gwan-Hyoung Lee et al., Electron tunneling through atomically flat and ultrathin hexagonal boron nitride, Applied physics letters,99,243114(2011).

International Search Report for International Application No. PCT/KR2021/014587 dated Oct. 19, 2021.

* cited by examiner

OPTICAL DEVICE AND OPERATION METHOD THEREOF

This application is a national phase under 35 U.S.C. § 371 of PCT International Application No. PCT/KR2021/014587 which has an International filing date of Oct. 19, 2021 which claims priority to Korean Application No. 10-2021-0078971, filed Jun. 17, 2021 the entire contents of each of which are hereby incorporated by reference.

Technical Field

The present invention relates to an optical device including a ring resonator, and more particularly, to an optical device including a ring resonator with a van der Waals heterostructure and a method for operating the same.

Background Art

In general, various optical devices using photonics technology are manufactured based on a silicon-on-insulator (SOI) wafer. Such optical devices include a light source, photodetector, optical modulator, photodiode, polarization rotator, polarization splitter, wavelength division multiplexer, wavelength division demultiplexer, optical power splitter, etc.

Meanwhile, graphene is a material of a two-dimensional planar structure in which carbon atoms are connected in a honeycomb-shaped hexagonal form through an sp2 bond. Graphene has high electron mobility, high light transmittance, and excellent thermal conductivity, and thus may be used for various purposes in the industrial fields of semiconductors, energy, displays, etc. In particular, researches are actively carried out to apply graphene to various optical devices using photonics technology.

DISCLOSURE OF THE INVENTION

Technical Problem

One technical problem of the present invention is to provide an optical device including a ring resonator with a van der Waals heterostructure.

One technical problem of the present invention is to provide an operation method for using the above optical device as a light source, a photodetector, or an optical modulator.

The problems to be solved by the present invention are not limited to the above-mentioned problems, and other problems not mentioned would be clearly understood by those of ordinary skill in the art from the disclosure below.

Technical Solution

In order to resolve the above technical problems, an optical device according to an embodiment of the present invention may include a substrate, an optical waveguide extending in a first direction on the substrate, and a ring resonator adjacent to the optical waveguide in a second direction intersecting the first direction on the substrate, wherein the ring resonator may include a first graphene layer and a second graphene layer on the substrate, a first insulating layer between the substrate and the first graphene layer, a second insulating layer between the first graphene layer and the second graphene layer, a first electrode and a second electrode connected to the first graphene layer, and a third electrode connected to the second graphene layer, wherein the first graphene layer, the second graphene layer, the first insulating layer, and the second insulating layer may have a ring shape or a partially open ring shape.

The first insulating layer and the second insulating layer may include a hexagonal boron nitride, and junctions of the first and second graphene layers and the first and second insulating layers may be a van der Waals heterostructure.

A thickness of the first insulating layer may be larger than a thickness of the second insulating layer.

The first graphene layer may have a partially open ring shape, the first electrode may be connected to one end of the first graphene layer, the second electrode may be connected to the other end of the first graphene layer, and the first electrode and the second electrode may be spaced apart from each other.

The second graphene layer may have a partially open ring shape, and the third electrode may be connected to both of one end and the other end of the second graphene layer.

The first graphene layer and the second graphene layer may be spaced apart from each other with the second insulating layer therebetween.

The resonator may be provided in plurality, and the resonators may be arranged side by side in the first direction at one side of the optical waveguide.

The resonator may be provided in plurality, and the resonators may be arranged in a zigzag pattern at both sides of the optical waveguide.

Diameters of upper surfaces of the first and second graphene layers and the first and second insulating layers may be the same, and sidewalls of the first and second graphene layers and the first and second insulating layers may be aligned with each other.

The optical device may be used as a light source, a photodetector, or an optical modulator by controlling a magnitude, period, and timing of voltage applied to the first to third electrodes of the ring resonator.

Furthermore, a method for operating an optical device according to an embodiment of the present invention may include applying a first voltage to a first electrode. Here, the optical device may include a substrate, an optical waveguide extending in one direction on the substrate, and a ring resonator including a first insulating layer, a first graphene layer, a second insulating layer, and a second graphene layer that are sequentially stacked on the substrate, a first electrode and a second electrode connected to the first graphene layer, and a third electrode connected to the second graphene layer, wherein the first graphene layer, the second graphene layer, the first insulating layer, and the second insulating layer may have a ring shape or a partially open ring shape, the first insulating layer and the second insulating layer may include a hexagonal boron nitride, and junctions of the first and second graphene layers and the first and second insulating layers may be a van der Waals heterostructure.

The method may further include grounding the second electrode and emitting light from the ring resonator, wherein the first voltage may be a direct current voltage, an alternating current voltage, or a pulse voltage.

The method may further include grounding the second electrode and applying a second voltage to the third electrode, wherein the first voltage and the second voltage may be a pulse voltage, and a pulse duration of the first voltage and a pulse duration of the second voltage may differ from each other.

The pulse duration of the first voltage may be longer than the pulse duration of the second voltage.

A difference between the pulse duration of the first voltage and the pulse duration of the second voltage may be 10 fs to 10 ns.

The method may further include radiating light to the ring resonator, applying a second voltage to the third electrode, connecting an amperemeter to the second electrode, and measuring a flow of electrons transferred from the second graphene layer to the first graphene layer through the second insulating layer by using the amperemeter.

Furthermore, a method for operating an optical device according to an embodiment of the present invention may include inputting input light to an optical waveguide, controlling a voltage applied to a third electrode, and outputting output light from the optical waveguide. Here, the optical device may include a substrate, an optical waveguide extending in one direction on the substrate, and a ring resonator including a first insulating layer, a first graphene layer, a second insulating layer, and a second graphene layer that are sequentially stacked on the substrate, a first electrode and a second electrode connected to the first graphene layer, and a third electrode connected to the second graphene layer, wherein the first graphene layer, the second graphene layer, the first insulating layer, and the second insulating layer may have a ring shape or a partially open ring shape, the first insulating layer and the second insulating layer may include a hexagonal boron nitride, and junctions of the first and second graphene layers and the first and second insulating layers may be a van der Waals heterostructure.

The controlling of the voltage applied to the third electrode may be periodically applying a voltage to the third electrode.

The voltage applied to the third electrode may be about 0.1 V to 30 V.

A Fermi level of the first graphene layer when the voltage is not applied to the third electrode may be higher than the Fermi level of the first graphene layer when the voltage is applied to the third electrode.

Advantageous Effects

The optical device according to an embodiment of the present invention may be used as a light source, a photodetector, or an optical modulator through a ring resonator with a van der Waals heterostructure.

Furthermore, the optical device according to an embodiment of the present invention may be integrated with a silicon electronic chip to implement silicon photonics, and thus enables high-density integration and may be compatible with CMOS chips and the like.

MODE FOR CARRYING OUT THE INVENTION

Figure 1A:
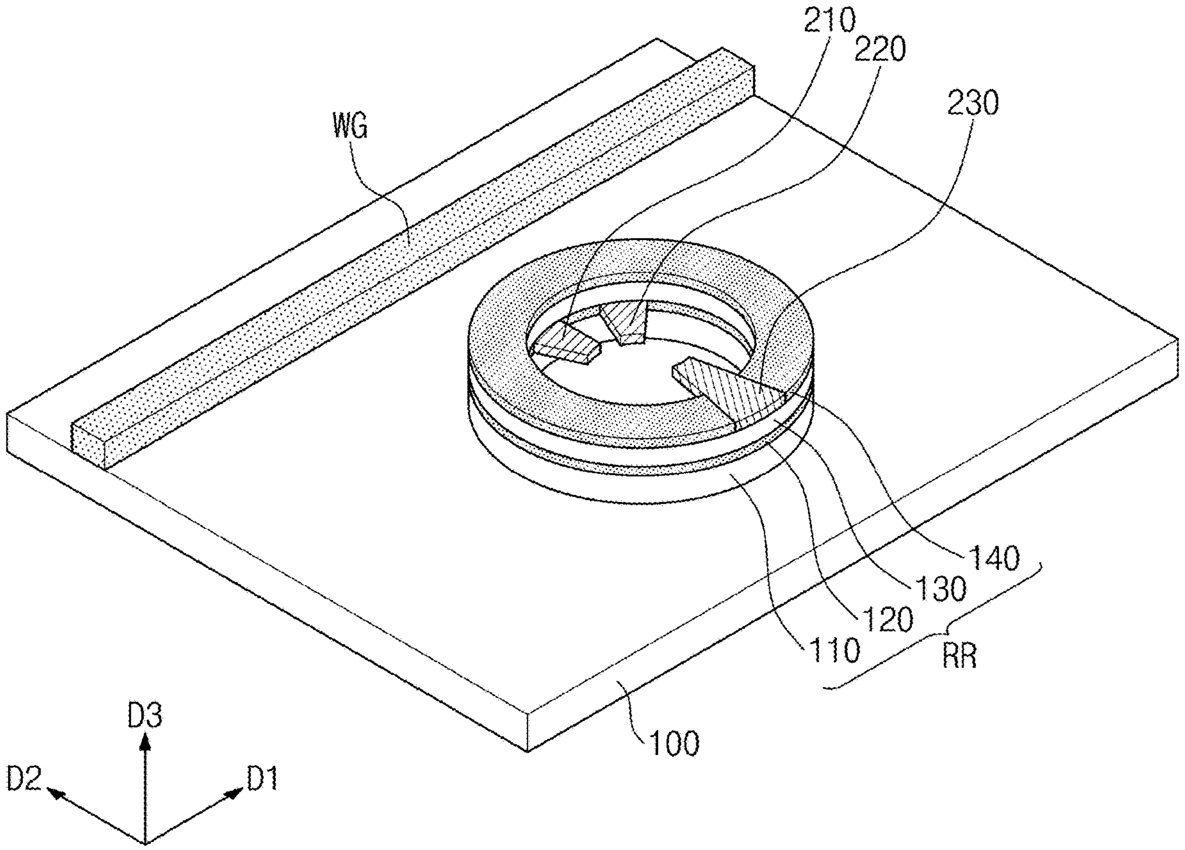
FIG. 1A is a perspective view for describing an optical device according to embodiments of the present invention.

Hereinafter, preferred embodiments of the present invention will be described with reference to the accompanying drawings so that the configuration and effects of the present invention are sufficiently understood.

The present invention is not limited to the embodiments described below, but may be implemented in various forms and may allow various changes and modifications. Rather, the embodiments are provided so that this disclosure will be thorough and complete, and will fully convey the scope of the present invention to those of ordinary skill in the art. In the accompanying drawings, the scale ratios among elements may be exaggerated or reduced for convenience.

The terminology used herein is not for limiting the present invention but for describing particular embodiments. Furthermore, the terms used herein may be interpreted as the meanings known in the art unless the terms are defined differently.

The terms of a singular form may include plural forms unless otherwise specified. It will be further understood that the terms "includes", "including", "comprises", and/or "comprising", when used in this specification, specify the presence of stated elements, steps, operations, and/or components, but do not preclude the presence or addition of one or more other elements, steps, operations, components, and/or groups thereof.

The terms "first", "second", and the like are used herein to describe various regions, directions, shapes, etc., but these regions, directions, and shapes should not be limited by these terms. These terms are only used to distinguish one region, direction, or shape from another region, direction, or shape. Therefore, a part referred to as a first part in an embodiment may be referred to as a second part in another embodiment. The embodiments described herein also include complementary embodiments thereof. Like reference numerals refer to like elements throughout.

Hereinafter, an optical device and a method for operating the same according to an embodiment of the present invention will be described with reference to the accompanying drawings.

Figure 1B:
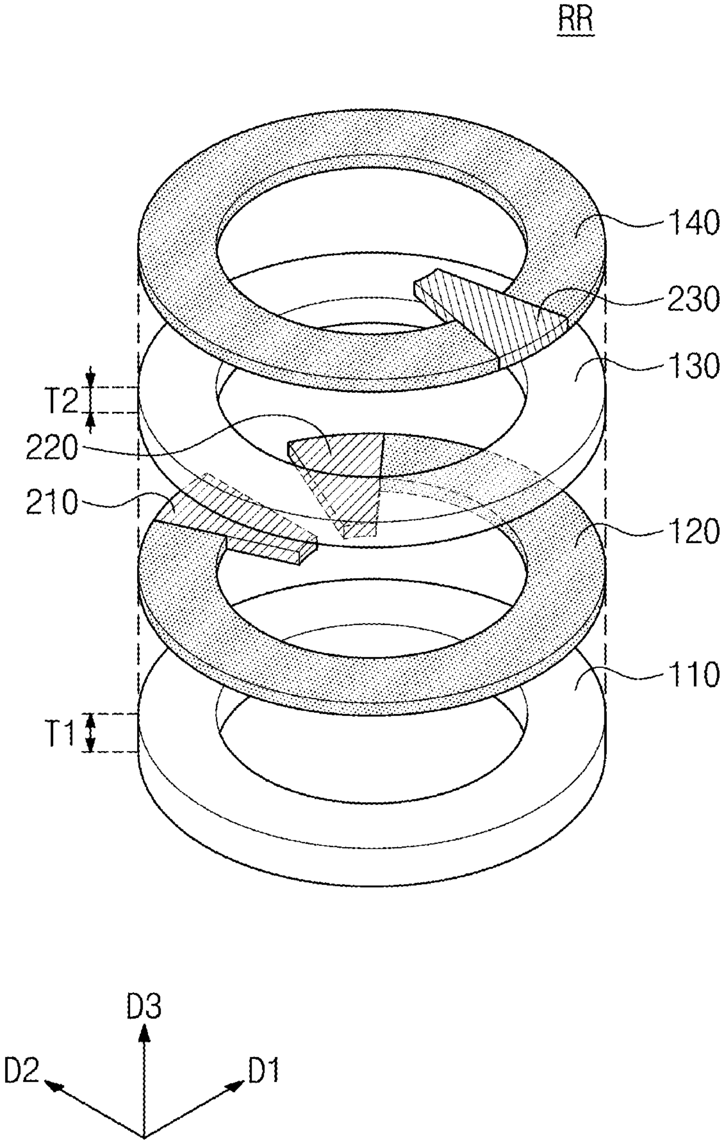
FIG. 1B is an exploded perspective view for describing a ring resonator of an optical device according to embodiments of the present invention.

FIG. 1A is a perspective view for describing an optical device according to embodiments of the present invention. FIG. 1B is an exploded perspective view for describing a ring resonator of an optical device according to embodiments of the present invention.

Referring to FIGS. 1A and 1B, the optical device according to the present invention may include a substrate 100, a ring resonator RR on the substrate 100, and an optical waveguide WG. The substrate 100 may be, for example, a semiconductor substrate including silicon or the like or a silicon-on-insulator (SOI) substrate including a silicon oxide. The substrate 100 may have an upper surface that is parallel with a first direction D1 and a second direction D2 intersecting the first direction D1 and is perpendicular to a third direction D3. The first to third directions D1 to D3 may be, for example, directions orthogonal to each other.

The optical waveguide WG extending in the first direction D1 may be provided on the substrate 100. The optical waveguide WG, for example, may have a line shape protruding in the third direction D3 from the substrate 100, but the present invention is not limited thereto. The optical waveguide WG may include, for example, silicon, silicon nitride, or boron nitride.

The ring resonator RR that is adjacent to the optical waveguide WG in the second direction D2 may be provided on the substrate 100. The ring resonator RR may include a first insulating layer 110, a first graphene layer 120, a second insulating layer 130, and a second graphene layer 140 that are sequentially stacked on the substrate 100. The first insulating layer 110 and the second insulating layer 130 each may have, for example, a ring shape. The first graphene layer 120 and the second graphene layer 140 each may have, for example, a partially opened ring shape, i.e., C shape.

Diameters of upper surfaces of the first insulating layer 110, the first graphene layer 120, the second insulating layer 130, and the second graphene layer 140 may be substantially the same. In other words, sidewalls of the first insulating layer 110, the first graphene layer 120, the second insulating layer 130, and the second graphene layer 140 may be aligned with each other, but the present invention is not limited thereto.

The first insulating layer 110 may be provided between the upper surface of the substrate 100 and the first graphene layer 120. The first graphene layer 120 may be provided between the first insulating layer 110 and the second insulating layer 130. The second insulating layer 130 may be provided between the first graphene layer 120 and the second graphene layer 140. In particular, the first graphene layer 120 and the second graphene layer 140 may be spaced apart from each other in the third direction D3 with the second insulating layer 130 therebetween.

A thickness T1 of the first insulating layer 110 in the third direction D3 may be larger than a thickness T2 of the second insulating layer 130 in the third direction D3. Hereinafter, a thickness may refer to a thickness in the third direction D3. The thickness of each of the first graphene layer 120 and the second graphene layer 140 may be less than the thickness T2 of the second insulating layer 130.

The first insulating layer 110 and the second insulating layer 130 may include, for example, hexagonal boron nitride (hBN). The hBN is a two-dimensional material that is isostructural with graphene, and is stable at high temperature and has an excellent encapsulation effect. Each of junctions of the first and second graphene layers 120 and 140 and the first and second insulating layers 110 and 130 may be a van der Waals heterostructure that exhibits strong light-matter interaction at an interface thereof.

A first electrode 210 and second electrode 220 connected to the first graphene layer 120 may be provided. The first electrode 210 may be connected to one end of the first graphene layer 120 having a C shape, and the second electrode 220 may be connected to the other end of the first graphene layer 120. The first electrode 210 and the second electrode 220 may be provided at substantially the same level as the first graphene layer 120. The first electrode 210 and the second electrode 220 may be spaced apart from each other in a tangential direction of a ring. The first electrode 210 and the second electrode 220 may extend in a radial direction of a ring, and a portion of each of the first electrode 210 and the second electrode 220 may protrude from an inner wall of the first graphene layer 120. The first electrode 210 and the second electrode 220 may be referred to as a source electrode and a drain electrode.

A third electrode 230 connected to the second graphene layer 140 may be provided. The third electrode 230 may be connected to both of one end and the other end of the second graphene layer 140 having a C shape. That is, the third electrode 230 may connect the one end and the other end of the second graphene layer 140. The third electrode 230 may be provided at substantially the same level as the second graphene layer 140 and at a higher level than the first electrode 210 and the second electrode 220. The third electrode 230 may extend in a radial direction, and a portion of the third electrode 230 may be protrude from an inner wall of the second graphene layer 140. The third electrode 230 may be referred to as a gate electrode.

The optical device according to the present invention may be used as a light source, a photodetector, or an optical modulator by controlling a magnitude, period, or timing of voltage applied to the first to third electrodes 210 to 230.

Figure 2A:
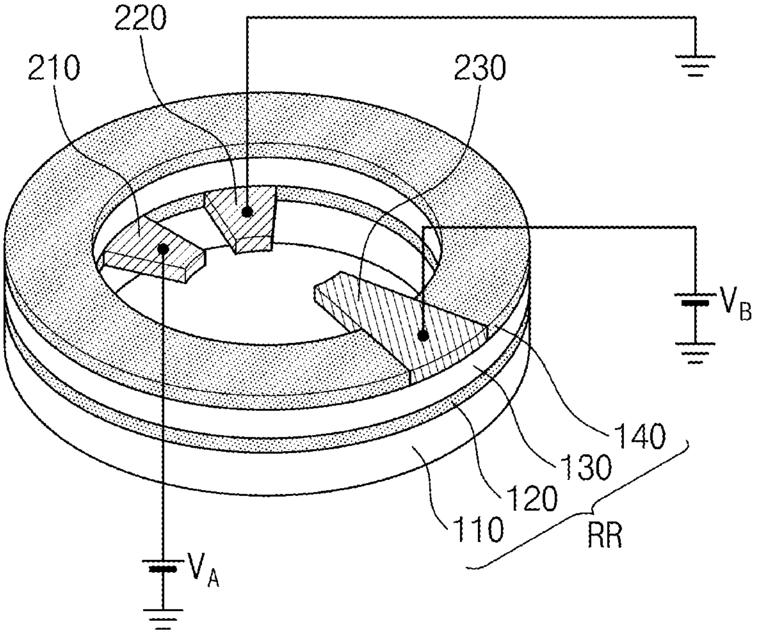
FIG. 2A is a perspective view for describing an optical device and a method for operating the same according to embodiments of the present invention.

FIG. 2A is a perspective view for describing an optical device and a method for operating the same according to embodiments of the present invention.

Referring to FIG. 2A, the optical device according to the present invention may be used as a light source by applying a first voltage $V_A$ and a second voltage $V_B$ to the first electrode 210 and the third electrode 230 respectively and grounding the second electrode 220. In other words, the method for operating the optical device according to the present invention may include, for example, applying the first voltage $V_A$ and the second voltage $V_B$ to the first electrode 210 and the third electrode 230 respectively, grounding the second electrode 220, and emitting light from the ring resonator RR. According to embodiments, voltage may not be applied to the third electrode 230. Here, the first voltage $V_A$ and the second voltage $V_B$ may be about 0.1 V to 30 V.

Figure 2B:
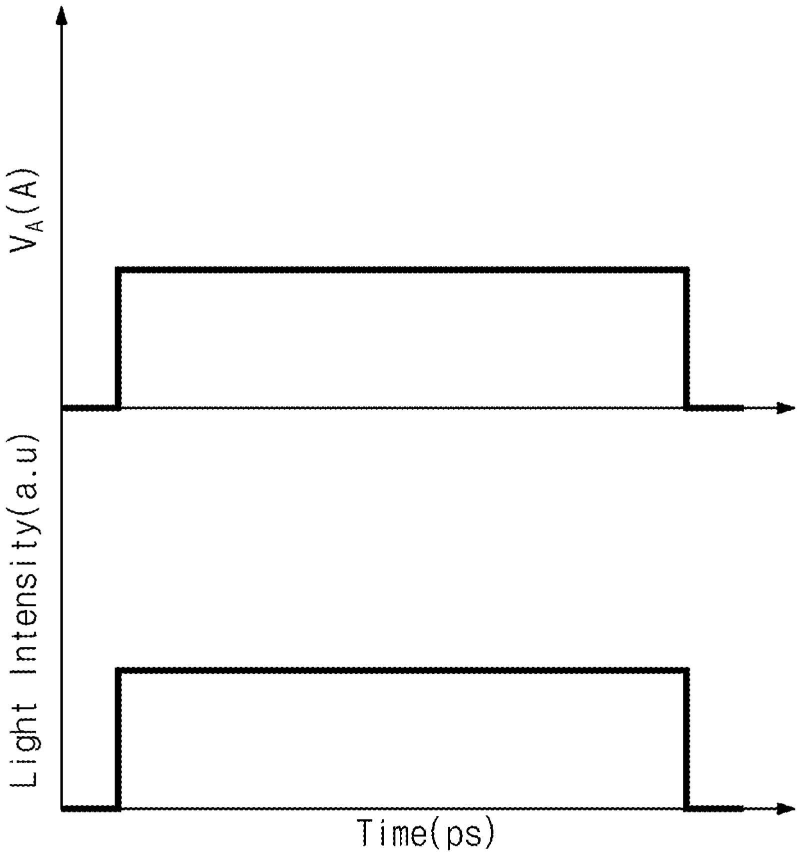
FIGS. 2B, 2C, and 2D are graphs for describing a method for operating an optical device according to embodiments of the present invention.
Figure 2C:
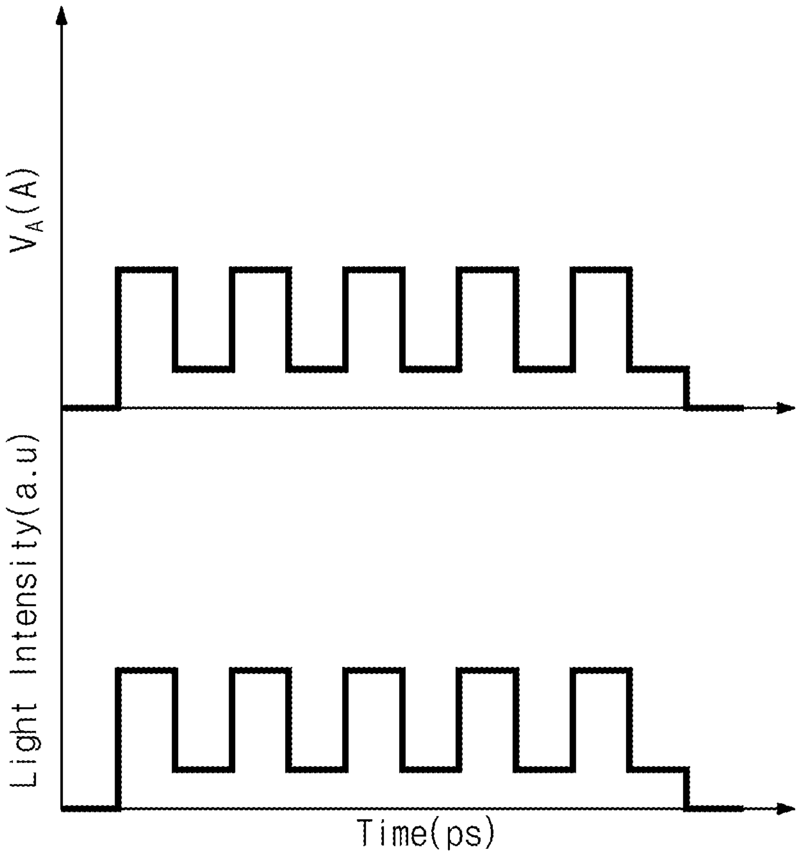
Figure 2D:
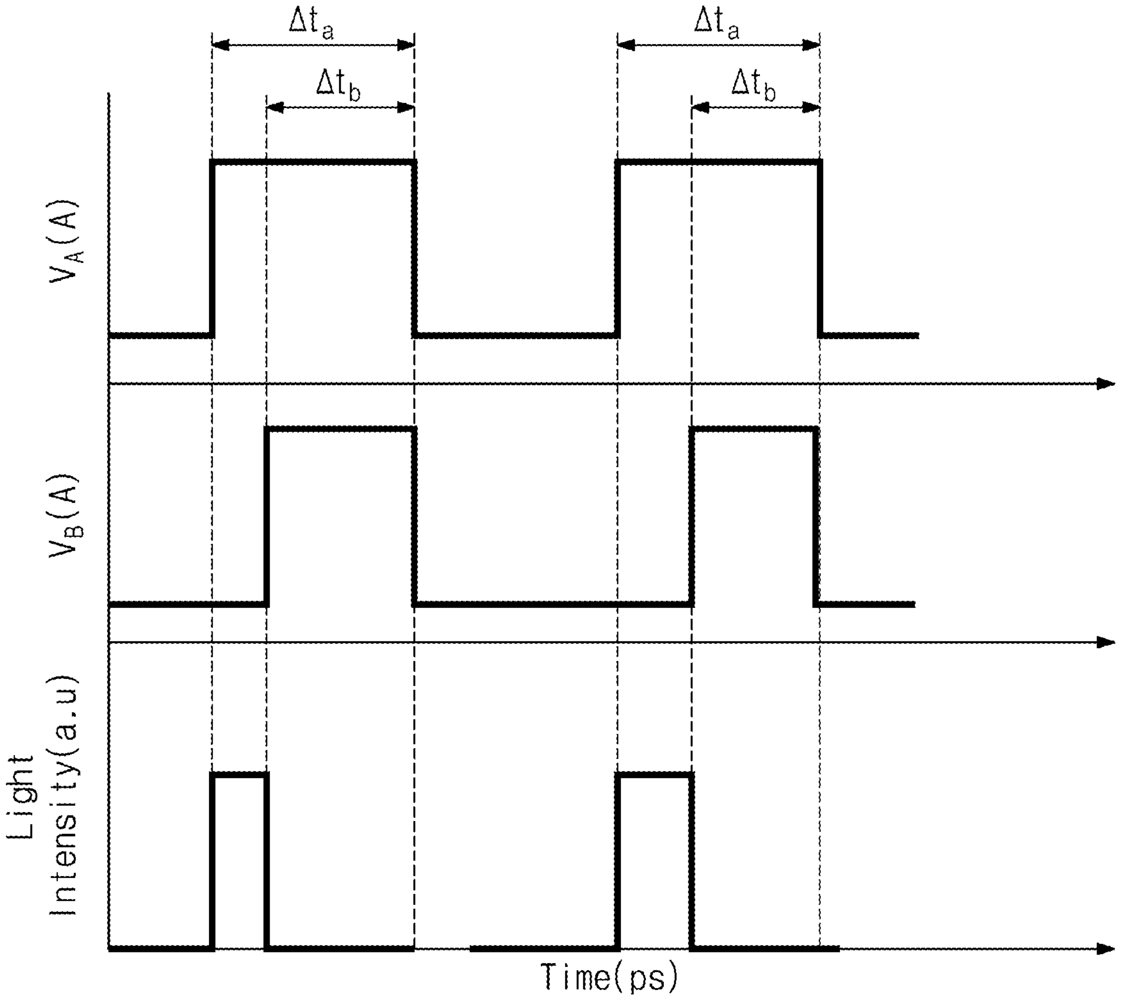

FIGS. 2B, 2C, and 2D are graphs for describing a method for operating an optical device according to embodiments of the present invention. In each of the graphs, the horizontal axis represents time (unit is ps (=$10^{-12}$ seconds)), and the vertical axis represents a magnitude of voltage or intensity of light.

Referring to FIGS. 2A, 2B, 2C, and 2D, light may be emitted from the ring resonator RR when the first voltage $V_A$ is applied to the first electrode 210 and the second electrode 220 is grounded.

FIG. 2B illustrates the case in which a direct current voltage DC is applied to the first electrode 210, and FIG. 2C illustrates the case in which an alternating current voltage AC or pulse voltage is applied to the first electrode 210. The intensity of emitted light may be proportional to the magnitude of an applied voltage.

In more detail, when the direct current voltage DC is applied to the first graphene layer 120 through the first electrode 210, light having certain intensity may be emitted through thermal radiation due to Joule heating. Furthermore, when the alternating current voltage AC or pulse voltage is applied to the first graphene layer 120 through the first electrode 210, light having a frequency of at least about 10 GHz may be emitted from an unequal state of thermal electrons and phonons. The frequency of emitted light may be controlled according to an applied voltage.

FIG. 2D illustrates the case in which the first voltage $V_A$ and the second voltage $V_B$ are applied to the first electrode 210 and the third electrode 230 respectively and the second electrode 220 is grounded. The first voltage $V_A$ and the second voltage $V_B$ each may be a pulse voltage, and a pulse duration $\Delta t_a$ of the first voltage $V_A$ and a pulse duration $\Delta t_b$ of the second voltage $V_B$ may differ from each other. For example, the pulse duration $\Delta t_a$ of the first voltage $V_A$ may be longer than the pulse duration $\Delta t_b$ of the second voltage $V_B$. Light may be emitted in a pulse pattern having a pulse duration corresponding to a difference between the pulse duration $\Delta t_a$ of the first voltage $V_A$ and the pulse duration $\Delta t_b$ of the second voltage $V_B$. Here, the difference between the pulse duration $\Delta t_a$ of the first voltage $V_A$ and the pulse duration $\Delta t_b$ of the second voltage $V_B$ may be about 10 fs to 10 ns.

In more detail, light may be emitted through thermal electrons when the first voltage $V_A$ is applied to the first graphene layer 120 through the first electrode 210, and light may not be emitted since thermal electrons tunnel into the second graphene layer 140 and the third electrode 230 through the second insulating layer 130 when the second voltage $V_B$ is applied to the second graphene layer 140 through the third electrode 230. As a result, light having a higher frequency than that when an alternating current voltage or pulse voltage is applied to the first graphene layer 120 may be emitted, and the optical device according to the present invention may have a faster modulation rate than that of a light source including only a single graphene layer.

Figure 3A:
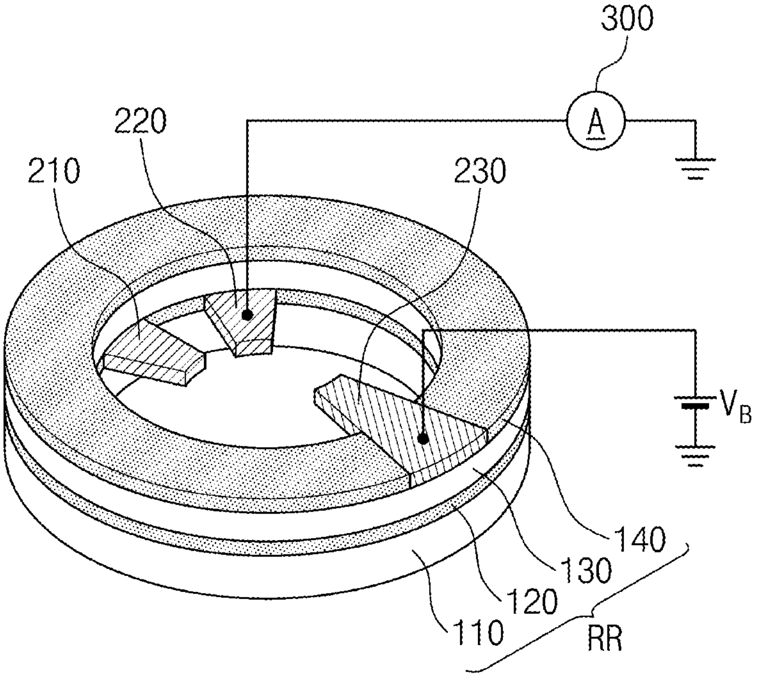
FIG. 3A is a perspective view for describing an optical device and a method for operating the same according to embodiments of the present invention.

FIG. 3A is a perspective view for describing an optical device and a method for operating the same according to embodiments of the present invention.

Referring to FIG. 3A, the optical device according to the present invention may be used as a photodetector by applying a voltage $V_B$ to the third electrode 230 and connecting an amperemeter 300 to the second electrode 220. In other words, the method for operating the optical device according to the present invention may include, for example, radiating light to the ring resonator RR, applying the voltage $V_B$ to the third electrode 230, connecting the amperemeter 300 to the second electrode 220, and measuring a photo current by using the amperemeter 300.

Figure 3B:
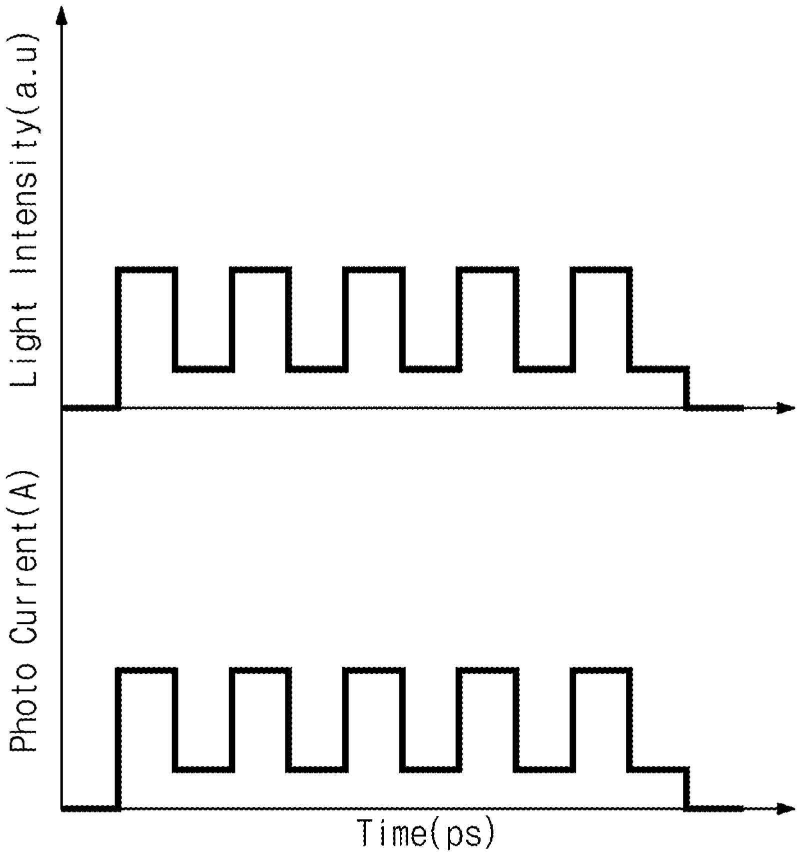
FIGS. 3B and 3C are graphs for describing a method for operating an optical device according to embodiments of the present invention.
Figure 3C:
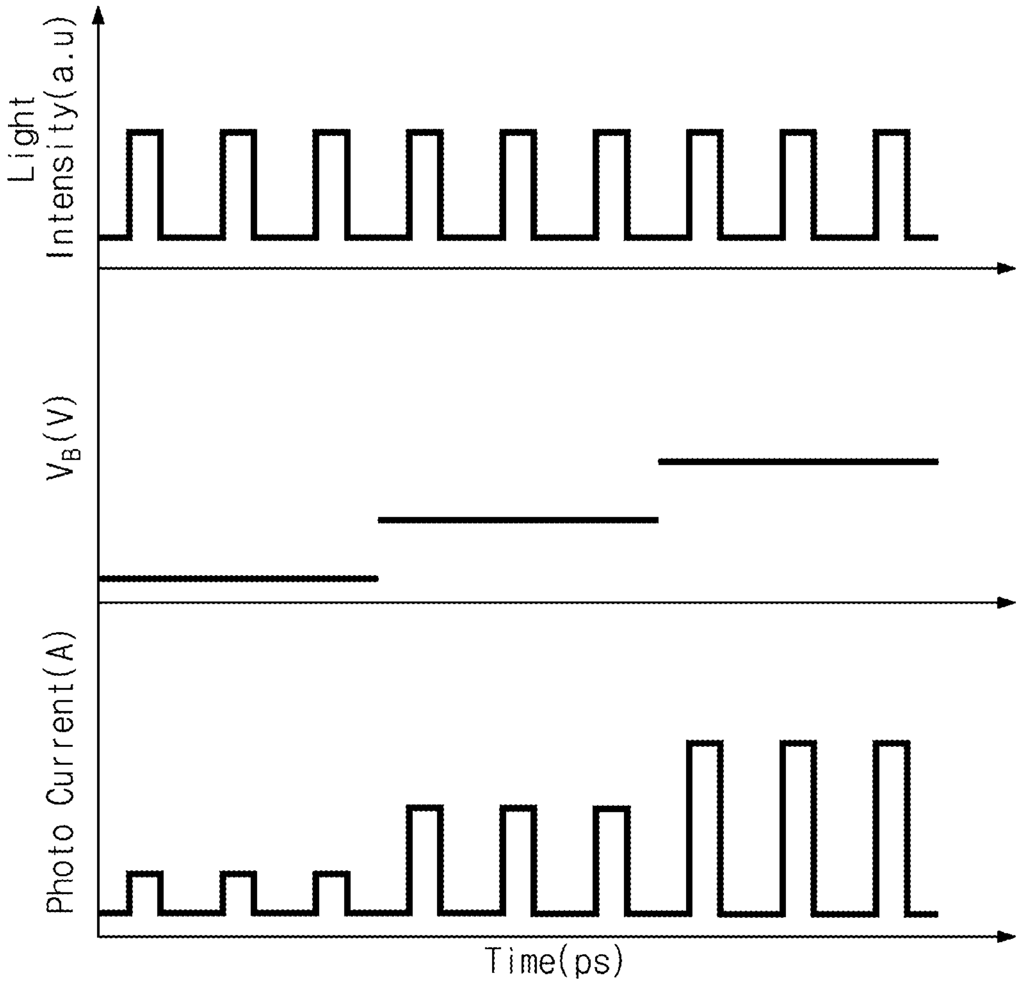

FIGS. 3B and 3C are graphs for describing a method for operating an optical device according to embodiments of the present invention. In FIGS. 3B and 3C, the horizontal axis represents time, and the vertical axis represents the intensity of light, the magnitude of the second voltage $V_B$ or the magnitude of photo current (unit is ampere (A)).

Referring to FIGS. 3A, 3B, and 3C, when light is radiated to the ring resonator RR and the voltage $V_B$ is applied to the third electrode 230, a photo current may be measured through the amperemeter 300. In more detail, electrons in the second graphene layer 140 excited by the light radiated to the ring resonator RR may be thermalized, and may be transferred to the first graphene layer 120 through the second insulating layer 130. A flow of electrons (i.e., photo current) transferred to the first graphene layer 120 may be measured through the amperemeter 300 connected to the second electrode 220. As the second voltage $V_B$ increases, more electrons may be transferred due to photon-assisted tunneling, and thus photodetection sensitivity may be improved.

Figure 4A:
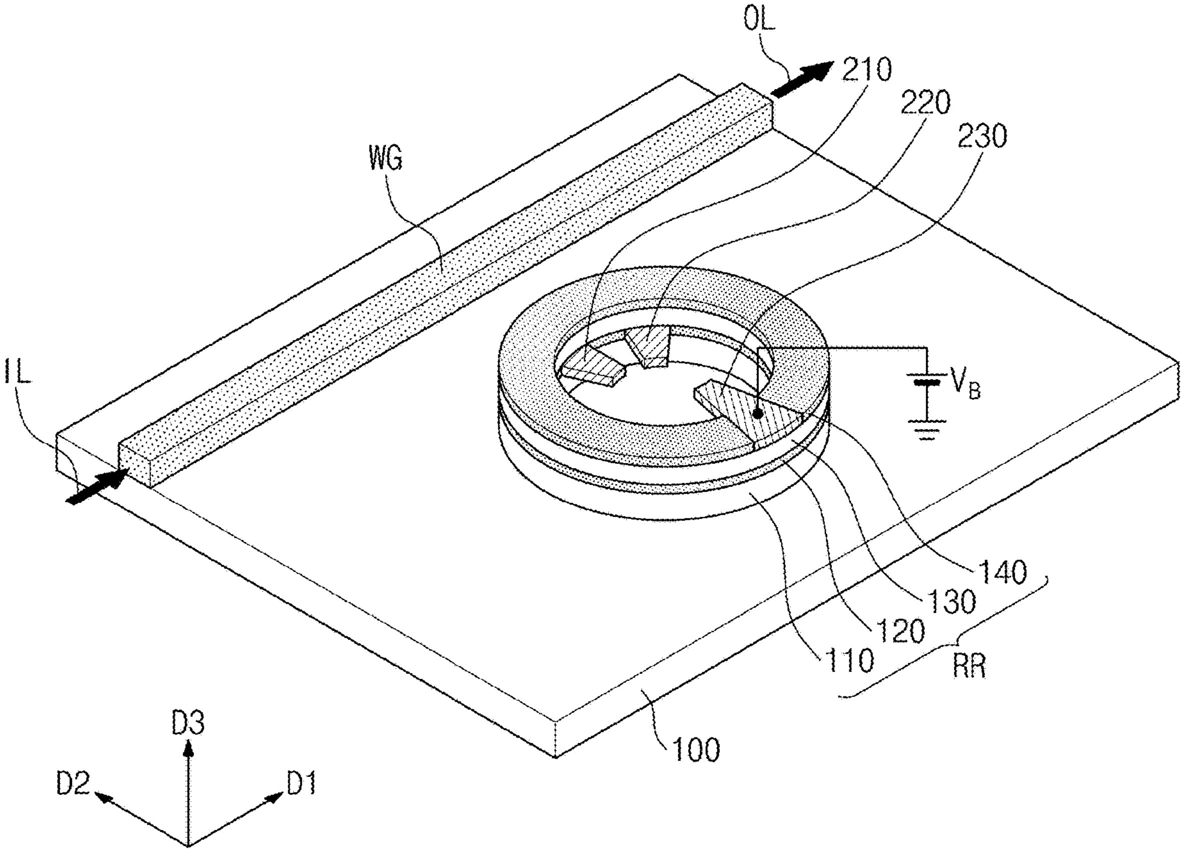
FIGS. 4A and 5A are perspective views for describing an optical device and a method for operating the same according to embodiments of the present invention.
Figure 4B:
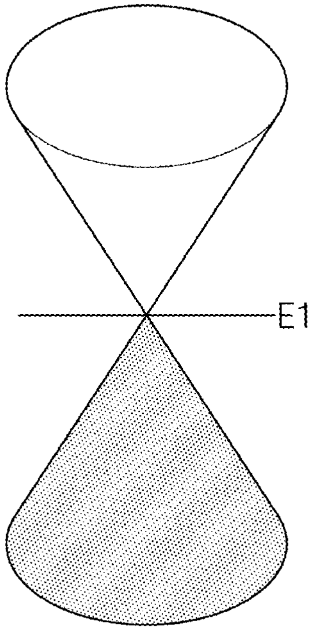
FIGS. 4B and 5B are mimetic diagrams illustrating a Fermi level of graphene.
Figure 5A:
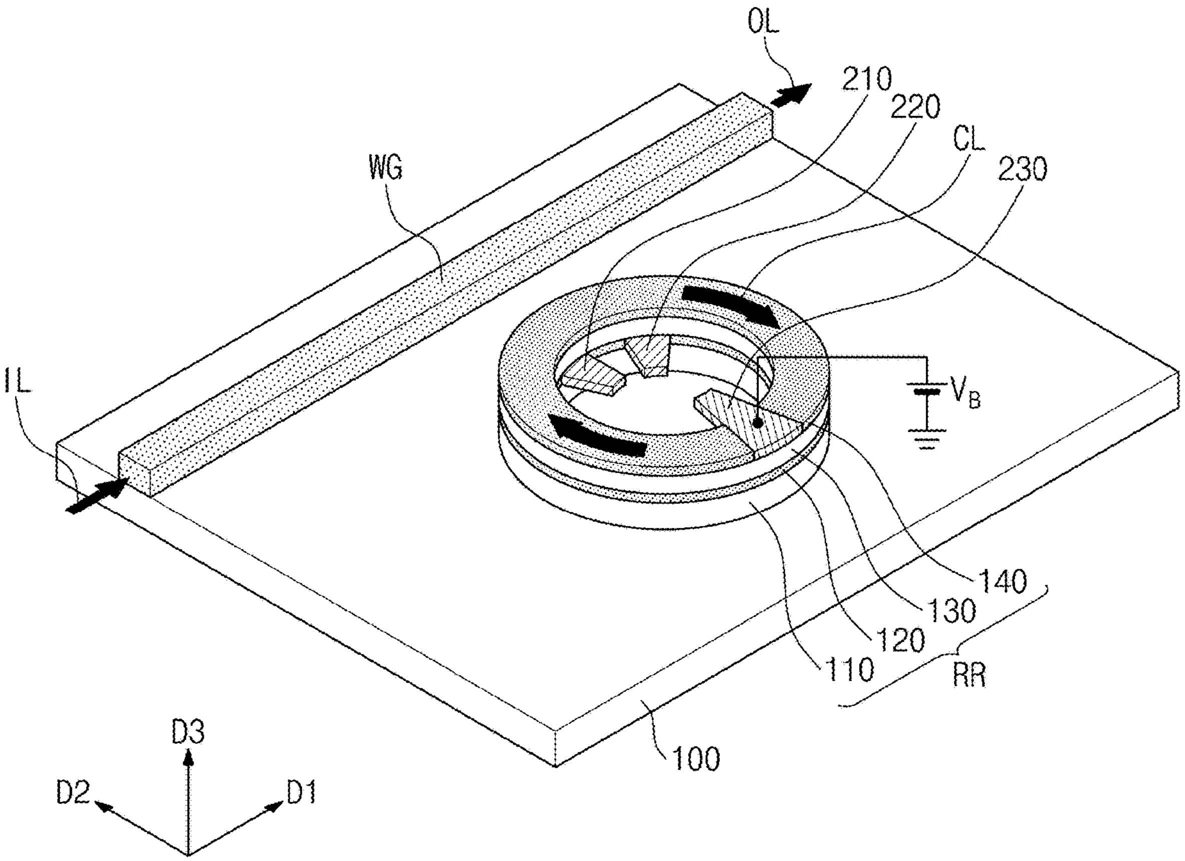
Figure 5B:
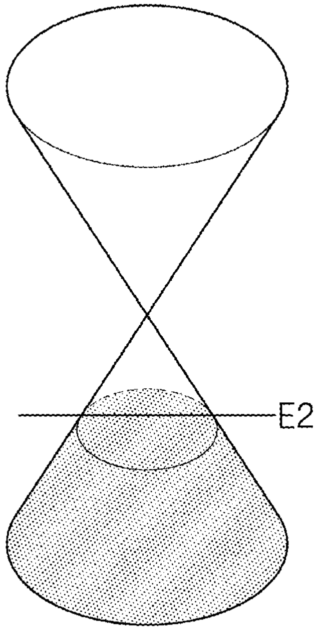

FIGS. 4A and 5A are perspective views for describing an optical device and a method for operating the same according to embodiments of the present invention. FIGS. 4B and 5B are mimetic diagrams illustrating a Fermi level of graphene.

Referring to FIGS. 4A, 4B, 5A, and 5B, the optical device according to the present invention may be used as an optical modulator by propagating light through the optical waveguide WG and controlling the voltage $V_B$ applied to the third electrode 230. In other words, the method for operating the optical device according to the present invention may include, for example, inputting input light IL to the optical waveguide WG, controlling the voltage $V_B$ applied to the third electrode 230, and outputting output light OL from the optical waveguide WG.

Referring to FIGS. 4A and 4B, when the input light IL is input through the optical waveguide WG and voltage is not applied to the third electrode 230, optical loss occurs on the input light IL propagating through the optical waveguide WG, and thus the input light IL may be decoupled with the ring resonator RR and output as the output light OL. Here, the Fermi level of the first graphene layer 120 may be a first level E1.

Referring to FIGS. 5A and 5B, when the input light IL is input through the optical waveguide WG and voltage is applied to the third electrode 230, light loss reduces due to Pauli blocking, and thus at least portion of the input light IL propagating through the optical waveguide WG may be coupled with the ring resonator RR, and coupling light CL may be generated in the ring resonator RR. Here, the intensity of the output light OL output through the optical waveguide WG may be less than that of the case of FIGS. 4A and 4B. Here, the Fermi level of the first graphene layer 120 may correspond to a second level E2, and the second level E2 may be lower than the first level E1. The second level E2 may be controlled by the voltage $V_B$ applied to the third electrode 230. For example, the voltage $V_B$ applied to the third electrode 230 may be about 0.1 V to 30 V.

Figure 6A:
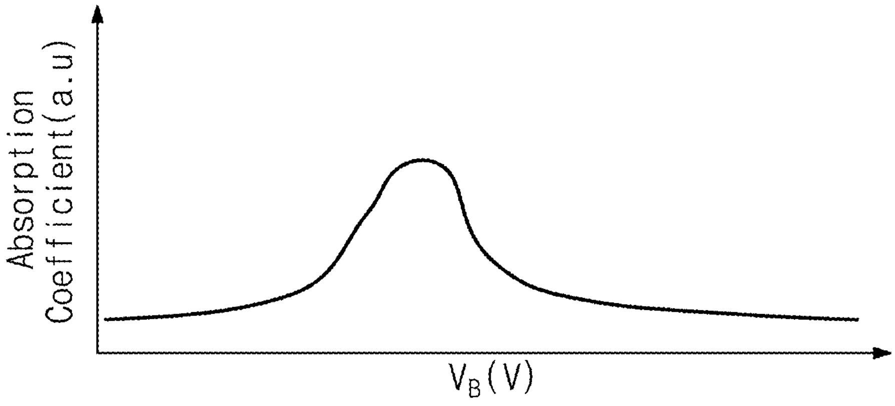
FIGS. 6A, 6B, and 6C are graphs for describing a method for operating an optical device according to embodiments of the present invention.
Figure 6B:
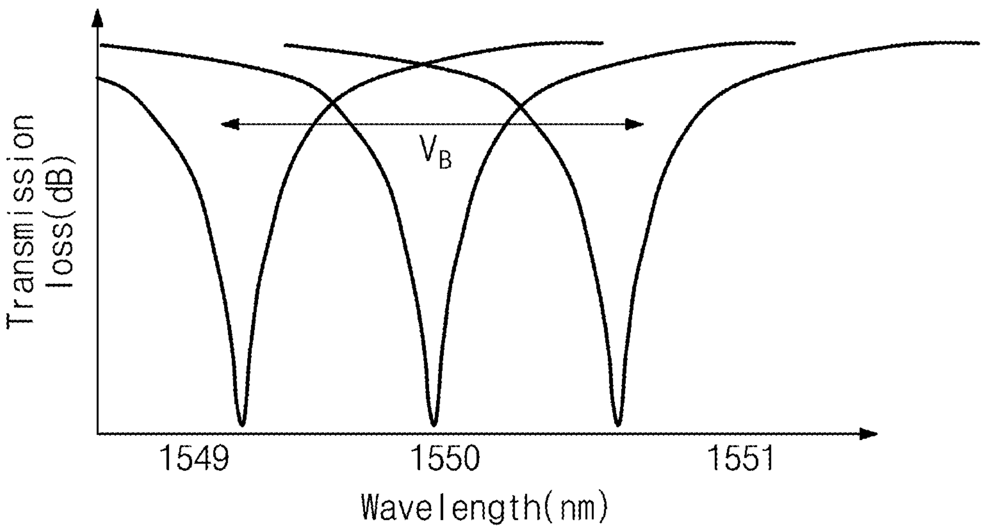
Figure 6C:
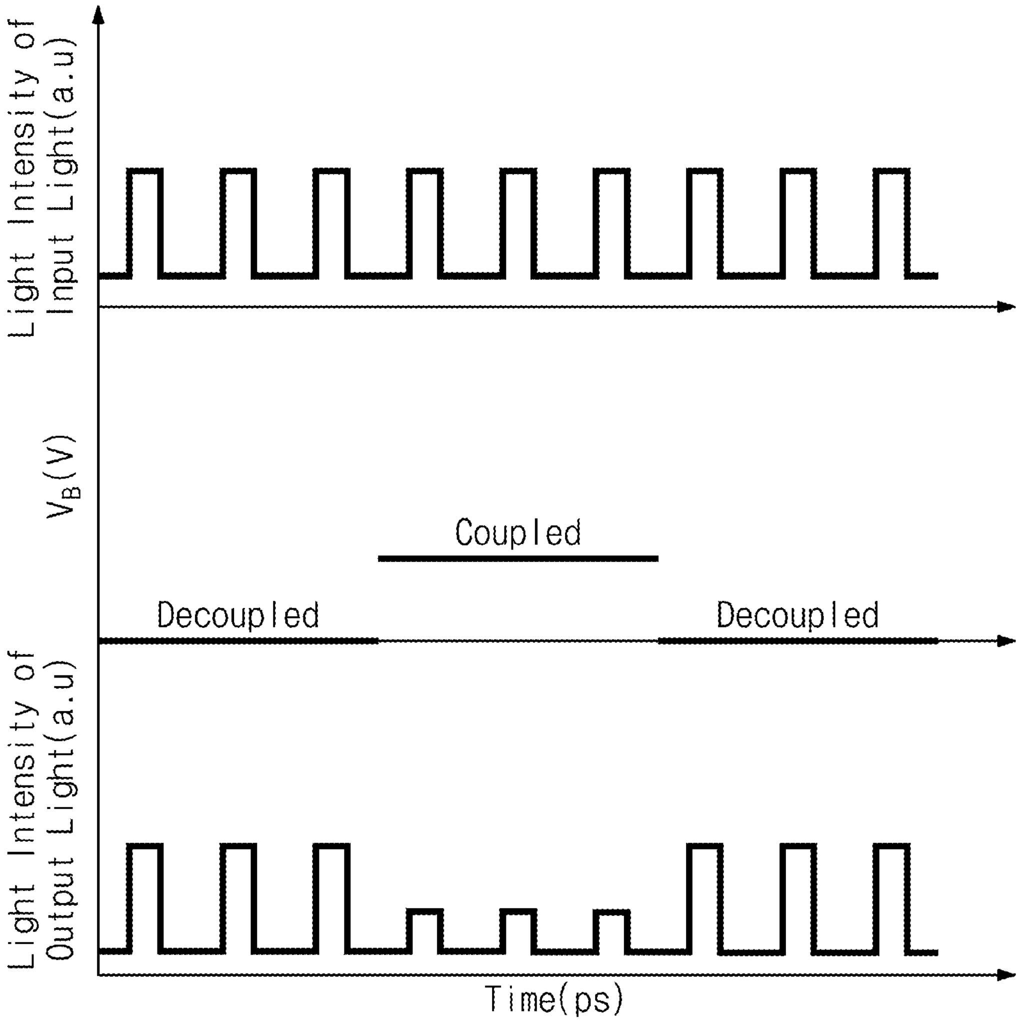

FIGS. 6A, 6B, and 6C are graphs for describing a method for operating an optical device according to embodiments of the present invention. In more detail, FIG. 6A illustrates an absorption coefficient according to the magnitude of the voltage $V_B$ applied to the third electrode 230 when a wavelength of the input light IL is constant, FIG. 6B illustrates transmission loss according to the wavelength (unit is nm) of the input light IL, and FIG. 6C illustrates the intensity of the input light IL, the magnitude of the voltage $V_B$ applied to the third electrode 230, and the intensity of the output light OL over time.

Referring to FIG. 6A, with regard to the input light IL of a particular wavelength, the absorption coefficient may decrease after increasing as the voltage $V_B$ applied to the third electrode 230 increases.

Referring to FIG. 6B, a wavelength at which the transmission loss reduces may vary according to Joule heating by applying the voltage $V_A$ to the first electrode 210 and by grounding the second electrode 220. That is, the wavelength at which the transmission loss reduces (coupling occurs) may be controlled by the voltage $V_A$ applied to the first electrode 210.

Referring to FIG. 6C, the intensity of the output light OL may be periodically changed by periodically applying the voltage $V_B$ to the third electrode 230. That is, in the method for operating the optical device according to the present invention, controlling the voltage $V_B$ applied to the third electrode 230 may be periodically applying the voltage $V_B$ to the third electrode 230.

Figure 7:
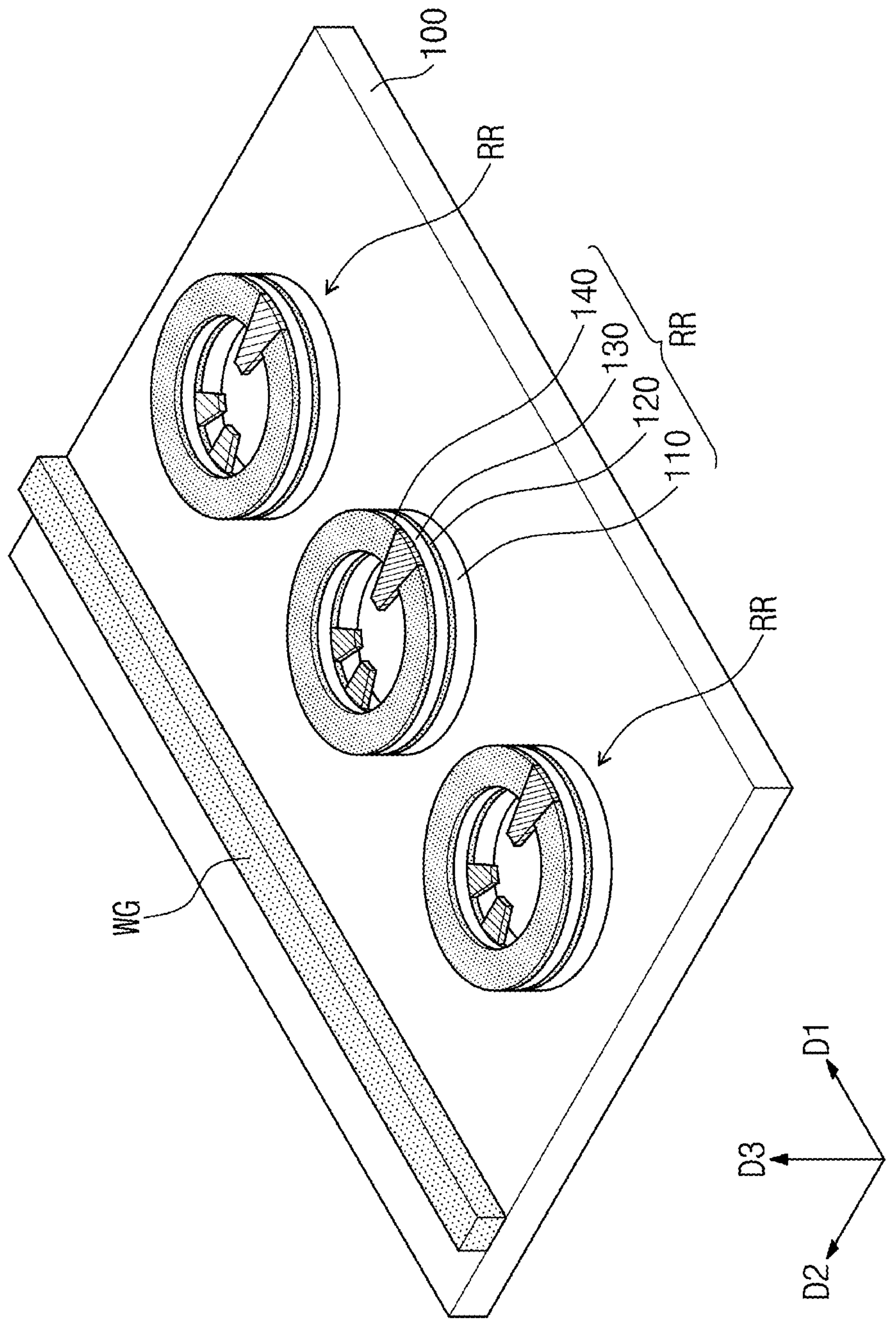
FIGS. 7 and 8 are perspective views for describing an optical device according to embodiments of the present invention.
Figure 8:
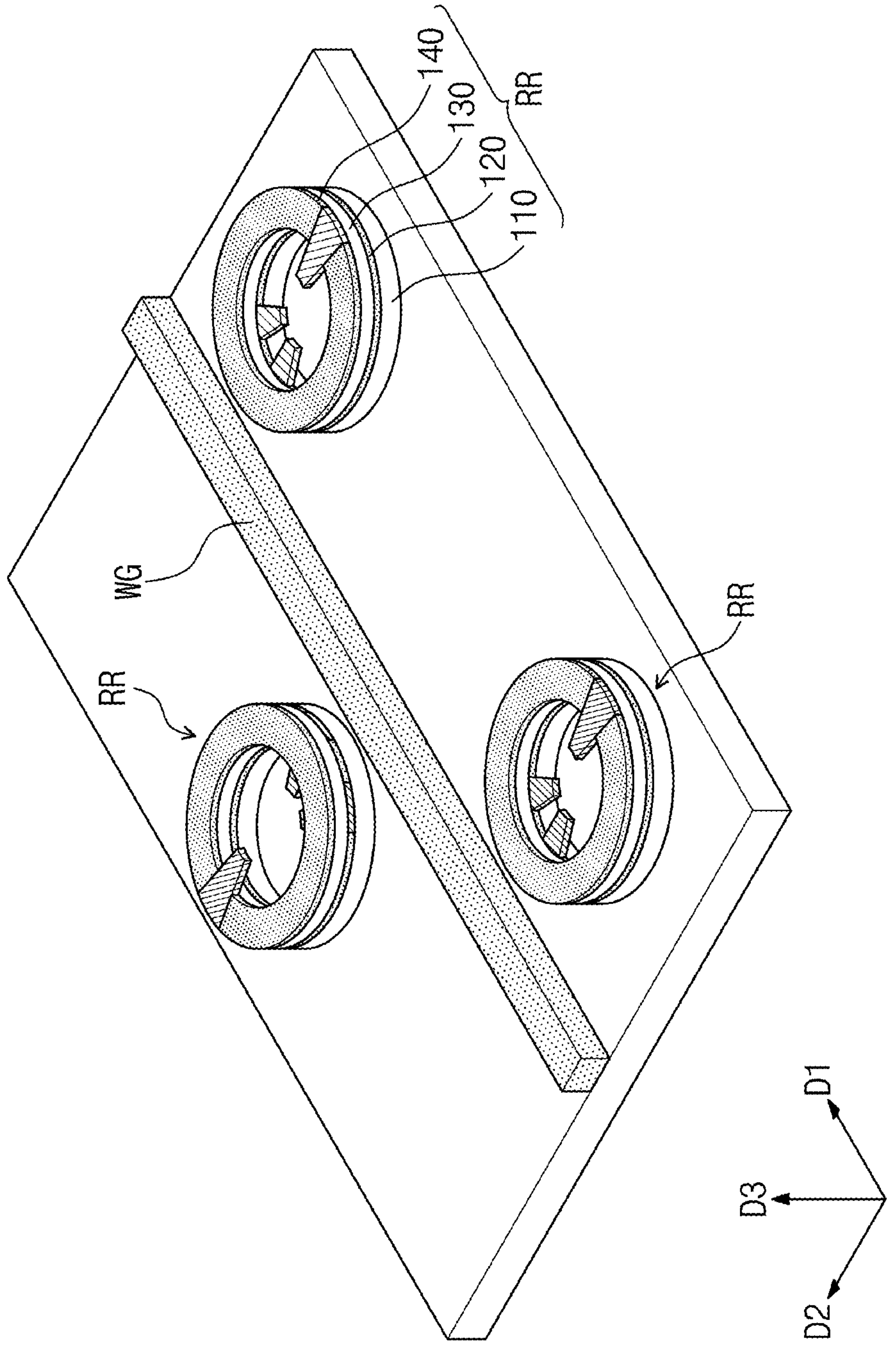

FIGS. 7 and 8 are perspective views for describing an optical device according to embodiments of the present invention. Hereinafter, for convenience, descriptions that are substantially the same as those provided above with reference to FIGS. 1A and 1B will not be provided, and differences will be described in detail.

Referring to FIGS. 7 and 8, the ring resonator RR may be provided in plurality. The plurality of ring resonators RR may have substantially the same structure. The plurality of ring resonators RR may be arranged side by side in the first direction D1 at one side of the optical waveguide WG as illustrated in FIG. 7, or may be arranged in a zigzag pattern at both sides of the optical waveguide WG as illustrated in FIG. 8. However, this is merely an example, and the present invention is not limited thereto, and thus the plurality of ring resonators RR may be arranged in various patterns around the optical waveguide WG.

Although embodiments of the present invention have been described with reference to the accompanying drawings, those of ordinary skill in the art could easily understood that the present invention can be carried out in other specific forms without changing the technical concept or essential features. Therefore, the above embodiments should be considered illustrative and should not be construed as limiting.

The invention claimed is:

1. An optical device comprising:

a substrate;

an optical waveguide extending in a first direction on the substrate; and a ring resonator adjacent to the optical waveguide in a second direction intersecting the first direction on the substrate, wherein the ring resonator includes:

a first graphene layer and a second graphene layer on the substrate;

a first insulating layer between, the substrate and the first graphene layer;

a second insulating layer between, the first graphene layer and the second graphene layer;

a first electrode and a second electrode connected to the first graphene layer; and a third electrode connected to the second graphene layer, wherein the first graphene layer and the second graphene layer have a partially open ring shape, wherein the first insulating layer and the second insulating layer have a ring shape.

2. The optical device of claim 1, wherein the first insulating layer and the second insulating layer include a hexagonal boron nitride, and junctions of the first and second graphene layers and the first and second insulating layers are a van der Waals heterostructure.

3. The optical device of claim 1, wherein a thickness of the first insulating layer is larger than a thickness of the second insulating layer.

4. The optical device of claim 1, wherein the first graphene layer has a partially open ring shape, the first electrode is connected to a first end of the first graphene layer on a first side of the first graphene layer, the second electrode is connected to a second end of the first graphene layer on the first side of the first graphene layer, and the first electrode and the second electrode are spaced apart from each other on the first side of the first graphene layer.

5. The optical device of claim 1, wherein the second graphene layer has a partially open ring shape, and the third electrode is connected to both of a first end and a second end of the second graphene layer.

6. The optical device of claim 1, wherein the first graphene layer and the second graphene layer are spaced apart from each other with the second insulating layer therebetween.

7. The optical device of claim 1, wherein the resonator is provided in plurality, and the resonators are arranged side by side in the first direction at one side of the optical waveguide.

8. The optical device of claim 1, wherein the resonator is provided in plurality, and the resonators are arranged in a zigzag pattern at both sides of the optical waveguide.

9. The optical device of claim 1, wherein diameters of upper surfaces of the first and second graphene layers and the first and second insulating layers are the same, and sidewalls of the first and second graphene layers and the first and second insulating layers are aligned with each other.

10. The optical device of claim 1, wherein the optical device is used as a light source, a photodetector, or an optical modulator by controlling a magnitude, period, and timing of voltage applied to the first electrode, the second electrode and the third electrode of the ring resonator.

11. The optical device of claim 1, wherein a first lower surface of the first insulating layer and a second lower surface of the optical waveguide are in a same horizontal plane on the optical device.

* * * * *